Jan. 31, 1933.                S. RUBEN                1,895,684
ELECTRIC CURRENT RECTIFIER
Filed Dec. 1, 1928
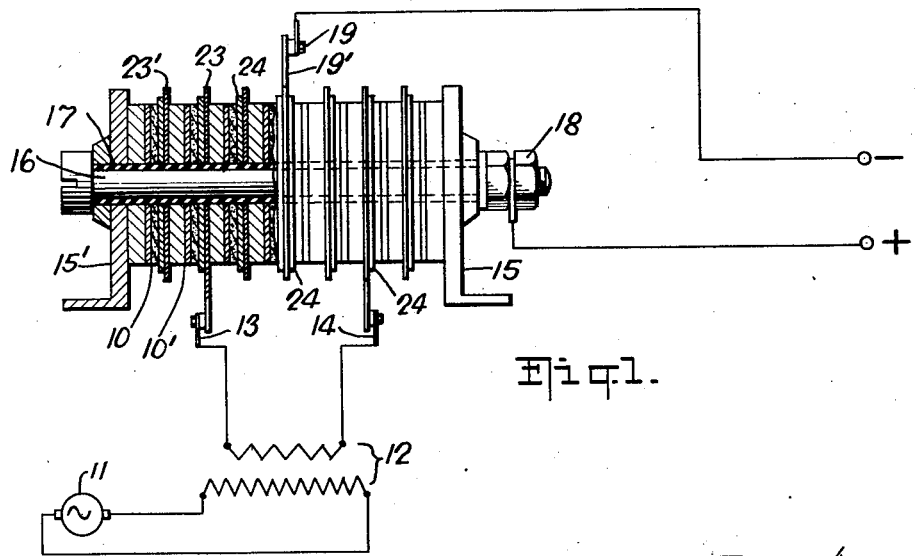
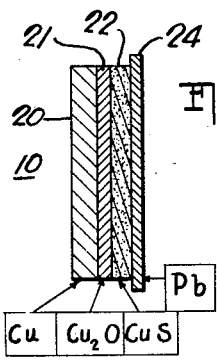
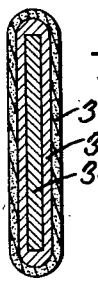
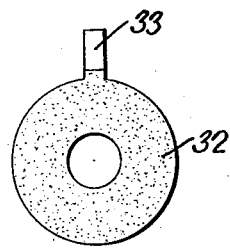
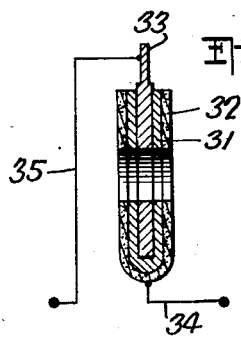
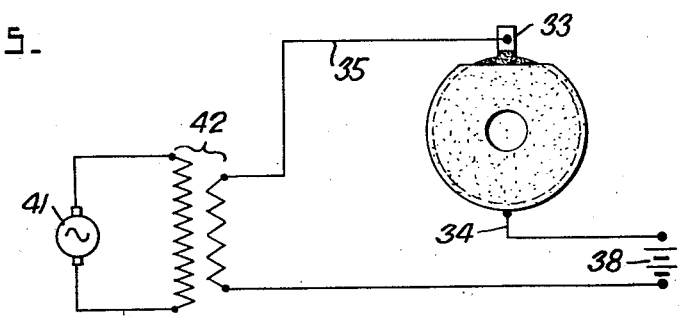
Inventor
Samuel Ruben
By Attorney
Warfield & Watson Patented Jan. 31, 1933

1,895,684

UNITED STATES PATENT OFFICE

SAMUEL RUBEN, OF NEW YORK, N. Y., ASSIGNOR TO RUBEN RECTIFIER CORPORATION, OF ENGLEWOOD, NEW JERSEY, A CORPORATION OF DELAWARE

ELECTRIC CURRENT RECTIFIER

Application filed December 1, 1928. Serial No. 323,084.

This invention relates to electric current rectifiers and the like, which employ electrode elements of the dry type, and more particularly to rectifiers of this character which employ electrode elements so formed that each constitutes a unitary rectifying cell.

Rectifiers of this type are known in which the electrode elements are a composite body of a metal coated intimately with an oxide compound thereof, in a manner which develops a rectifying junction at the surface which is overlaid by the compound. Such rectifiers depend for their operation upon the asymmetric resistance characteristics which obtain at this junction.

The present invention has for its object generally the provision of an improved device of the character described, which is efficient, economical and readily manufactured.

More specifically, it is an object to provide a rectifying electrode element which is more suitable than the prior art devices, for example, one which is capable of withstanding higher operating voltages and temperatures and at the same time has a more uniform distribution of resistance at the rectifying junction.

It is also an object to provide a rectifying element which is adapted for operating under a greater range of differences of impressed potential than is applicable to elements of copper which have a coating of cuprous oxide.

It is still a further object to provide a unitary electrode element which has additively the asymmetric conductivity of a plurality of junctions, for example, the asymmetric conductivities of both copper oxide and copper sulphide junctions with metals.

Other objects of the invention will in part be obvious and will in part appear hereinafter.

This case is a continuation, in part, of my co-pending application Serial No. 283,217, filed December 6, 1927.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention reference should be had to the following detailed description taken in connection with the accompanying drawing, in which:

Fig. 1 shows diagrammatically a rectifying device employing electrode elements constructed in accordance with the present invention connected in a bridge circuit for rectifying alternating current;

Fig. 2 represents a cross section of an electrode element of the present invention enlarged to show schematically the component parts thereof;

Fig. 3 is a cross section of an electrode element of the present invention at an intermediate stage in the process of its manufacture;

Fig. 4 shows a modified form of electrode element constructed in accordance with the invention; and Figs. 5 and 6 show schematically the manner in which electrode elements of the character shown in Fig. 4, may be connected in a circuit for effecting half-wave rectification of an alternating current.

Referring now to the drawing, and particularly to Fig. 1, 10 and 10' denote respectively electrode elements constructed as hereinafter described, which are adjacently disposed for series operation and comprise an arm of a bridge-connected rectifying unit that receives alternating current from a source of supply here denoted conventionally at 11. Such source has a greater difference of potential than it is desired directly to impress across the arms of the bridge-rectifying circuit. A step-down transformer 12 is accordingly interposed between the source 11 and the input terminals 13 and 14 of the rectifying unit, these terminals being connected across the low-tension side of the transformer 12. The other arms of the bridge circuit are similarly constructed of series-connected rectifying elements of the character shown at 10 and 10', the four arms being arranged in pairs to comprise two groups of elements which have the input electrodes 13 and 14 disposed therein at intermediate points, the groups being connected in inverted relation with respect to each other between conducting standards 15 and 15', which also serve as an output terminal and are connected together by means of the conducting rod 16 sheathed in an insulating tube 17 so as not to short-circuit the electrode elements. The end of this rod, indicated at 18, serves as the connecting means for one direct-current output terminal, whereas the other terminal of the output circuit is shown at 19, which is here formed as an extension of the conducting plate 19', interposed between the inverted groups of the electrode elements.

Fig. 2 illustrates an enlarged cross section of the electrode element shown at 10. These electrode elements comprise a metallic backing 20, which is of highly conducting metal and is adapted to form compounds with the chemical elements of the oxygen family in the Sixth Periodic group. Such metal may be, for example, tantalum silver or copper; copper, however, is preferred. On the backing 20 there is formed an intimate crystalline layer of an oxide of the metal. This layer is indicated at 21. In intimate contact with the layer 21, there is superposed a second layer 22, which is a substitution compound formed with another element of the oxygen family in the Sixth Periodic group.

A coated metallic body of this character constitutes a composite rectifying element having conjointly the advantages of a plurality of compounds of the chemical elements of the Sixth Periodic group. Such a rectifying element may be assembled in the rectifying unit shown in Fig. 1 between two conducting plates such as shown at 23 and 23', which effect electrical contact with the rectifying element. It is found in practice, however, that it is preferable to interpose between the coated side of the electrode element and the terminal plate 23, a buffer-contacting element such as shown at 24 in Fig. 2. Such buffer-contacting element is made of a relatively soft metal which is substantially inert as a rectifying element and is without polarizing effect. Lead has been ascertained to be a suitable material for the buffer-contacting plate 24.

Where copper is employed as the metallic base to be coated in order to provide a rectifying element as shown in Fig. 2, a clean copper plate is first preferably oxidized by heating in an oxidizing atmosphere substantially to 1,000° C. This oxidizing atmosphere, when at a pressure of substantially one atmosphere, will produce a layer of cuprous oxide of a desired thickness if the reaction period be maintained for substantially five minutes. When thus treated, the electrode element is quickly withdrawn from the reaction chamber and plunged into a quenching bath of cooling fluid. Such a bath should be of a non-oxidizing nature and may be, for example, a mineral oil or hydrochloric acid. The copper plate thus treated has formed thereon a dense homogeneous crystalline layer of cuprous oxide intimately and uniformly attached over the surface of the copper base.

In order that the electrode element shall have superposed layers of two different compounds of the Sixth Periodic group, it is thereafter subjected to a treatment by which a second layer is superposed upon the first. This is conveniently accomplished by taking the plates which have been oxidized and exposing them, in a closed reaction chamber, to the vapors of another compound of the Sixth Periodic group, for example, the vapors of sulphur heated to a temperature of about 425° C., the pressures of the vapors in this reaction chamber being preferably materially about atmospheric. Such treatment is preferably continued for a period of substantially five minutes, when a portion of the copper oxide coating at the surface of the copper base is converted into a sulphide by the process of substitution, cupric sulphide being the compound formed at the temperature indicated. At the completion of the reaction period, the electrode element is withdrawn from the reaction chamber and allowed to cool relatively slowly. Examination shows that as a result of this latter treatment, there is superposed upon the oxide layer a relatively dense homogeneous layer of blue cupric sulphide.

A copper body formed for service as an electrode element in this manner is, of course, uniformly coated on all sides with layers of the character indicated, a cross section of an electrode element at this stage being illustrated in Fig. 3, where 30 denotes a core comprising a plate of substantially pure copper; 31 denotes a crystalline layer or envelope of cuprous oxide, and 32 an outer layer or envelope of cupric sulphide.

In order to form this coated body into an electrode element comprising a copper plate coated only on one side with oxide and sulphide layers, it is preferably machined to remove the coatings from one side and expose the free surface of the copper. Any suitable mode of machining may be accomplished, for example, grinding.

Where a single element is to be employed to accomplish the rectifying effect, and it is not desired to assemble in operative relation a plurality of rectifying elements in order to form a rectifying unit, it is not necessary that the coatings be removed from one side of the coated plate as above described, since the element may be formed with a projecting conducting prong, as indicated at 33 in Fig. 4, through which conducting relations may be effected with the copper plate. The other terminal of the rectifying circuit is, of course, made by direct contact with the surface of the outermost coating 32. The manner in which this is accomplished is shown in Fig. 5, where the tab or prong 33 is connected to a conductor 35, and a conductor 34 is secured in direct conducting relation with one side of the coating 32. A rectifying circuit connected in this manner, is shown in full in Fig. 6, the rectifying element in side elevation. Here 41 represents an A. C. supply, 42 a step-down transformer, 33 and 34 the terminals of the rectifying element, a load which is supplied with rectified current being indicated at 38.

In operation, when the input terminal 13 is supplied with alternating current of positive polarity, current passes from this terminal through the rectifying elements 10' and 10 on the left to the conducting standard 15' which connects through conducting bolt 16, with the terminal 18 to supply direct current to the positive terminal of the load. From the negative terminal of the load, current continues its passage through the terminal 19 of the rectifying unit and thence through the pair of electrode elements which comprise the arm shown on the right of the plate 19' to the alternating current input terminal 14 and thence to the source of supply. The passage of the positive component of the current is thus seen to traverse successively the cupric sulphide layer, the cuprous oxide layer and the copper. One rectifying junction obtains between the layers of cupric sulphide and cuprous oxide and a second junction between the layer of cuprous oxide and the copper backing. The passage of current is accompanied by a drop of potential at both of these junctions, which is evidenced by the fact that there is a greater drop where this composite electrode element is used than would occur at a single junction of either variety. It is thus permissible to impress greater differences of potential across electrode elements of this character than across single rectifying junctions. It is also found by this arrangement that increased stability in the rectifying output is achieved.

While the passage of current has been traced for the circuit shown in Fig. 1, it is obvious that a similar passage takes place for the circuit shown in Fig. 6, where, if the lower terminal of the alternating current source has positive polarity, a direct current will pass through the load at 38 and thence through the conductor 34 through the coatings on the rectifying element to the copper backing 30, and thence by way of prong 33 and conductor 35 to the source of supply.

The step of quenching as herein practiced, provides an electrode element having superior characteristics to ordinary electrode elements of copper coated with cuprous oxide, since the electrode elements thus quenched have a relatively clean surface of cuprous oxide and the crystals which compose the cuprous oxide layer also adhere very intimately with the metallic backing or so-called "mother metal". In this manner the resistance of the electrode element is reduced, particularly the contact resistance.

Cuprous oxide, it has been ascertained, is one of the crystalline conductors that has a relatively wide variation of contact resistance with pressure. If characteristic curves be drawn showing the correlation between resistance and pressure for cuprous oxide crystals when in surface contact with a metallic electrode, the curves defining the functional relation between pressure and resistance are found to be power functions of hyperbolic form. The exponent denoting the power, applying particularly to the pressure variable, is generally negative and less than unity.

By the present invention such variation of resistance with pressure in cuprous oxide coated electrode elements is substantially compensated for by providing an intimately joined layer of cuprous sulphide, as herein provided. The use of the lead contact washers also appears to assist in nullifying any variation of resistance with pressure.

By the present invention it is thus seen that rectifying elements are provided which are relatively constant in their operating characteristics; aging also may be substantially dispensed with in order to reach stable operating conditions; and the losses incident to internal resistance are very materially reduced.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. In dry rectifying devices and the like, an electrode element therefor comprising a metallic base, an intimately joined oxide layer thereon formed to have a rectifying junction at the contacting surface with said metallic base, and a layer of a second compound of another chemical element in the oxygen family of the Sixth Periodic group integrally formed upon said oxide layer and adapted to form a second rectifying junction in series with the first.

2. In dry rectifying devices and the like, an electrode element therefor comprising a metallic base, a layer of an oxide compound thereof intimately joined with said metallic base and adapted to provide a rectifying junction at the contacting surface with said metallic base, and a sulphur compound of said metallic base integrally formed upon said oxide layer and adapted to provide a second rectifying junction in series with the first.

3. In dry rectifying devices and the like, an electrode element therefor comprising a backing of metallic copper, an intimately joined layer of an oxygen compound of copper formed on said copper backing and adapted to provide a rectifying junction at the adjoining surfaces, and a sulphur compound overlying said oxygen compound and intimately joined thereto to provide a second rectifying junction.

4. In dry rectifying devices and the like, an electrode element therefor comprising a backing of metallic copper, an intimately joined layer of cuprous oxide overlying a surface of said copper backing and providing a rectifying junction at said surface, and a layer of a sulphur compound of copper overlying said cuprous oxide layer and forming a second rectifying junction at the contacting surfaces of said compounds.

5. In dry rectifying devices and the like, an electrode element therefor comprising a backing of metallic copper, a layer of crystalline cuprous oxide intimately joined to said copper backing and providing a rectifying junction at the surface where joined, and a layer of cupric sulphide overlying said oxide layer and intimately joined thereto and adapted to provide a second rectifying junction at the juncture of said compounds.

6. In dry rectifying devices and the like, an electrode element therefor comprising a backing of metallic copper, and a layer of crystalline cuprous oxide on a surface of said copper backing and intimately joined thereto and formed to provide a rectifying junction; a portion of the outer surface of said crystalline layer being converted into a sulphur compound whereby a second rectifying junction is provided in series with the first.

7. In dry rectifying devices and the like, an electrode element therefor comprising a metallic backing, and a crystalline layer of an oxygen compound of the metal in said backing intimately joined to a surface of said backing and forming a rectifying junction therewith; a portion of the outer surface of said crystalline layer being converted to a sulphur compound whereby a second rectifying junction is provided in series with the first.

8. The method of forming electrode elements for dry rectifiers and the like, which comprises heating a metallic body in an atmosphere containing an element of the oxygen family in the Sixth Periodic group until a relatively thick compound thereof is formed thereon, quenching said heated element, again heating said electrode element in an atmosphere containing a second chemical element of the Sigth Periodic group, and thereafter cooling said element.

9. The method of forming electrode elements for dry rectifiers and the like, which comprises heating a metallic body in an oxidizing atmosphere until a relatively thick oxygen compound is formed thereon, quenching said heated element, again heating said electrode element in an atmosphere containing a chemical element of the oxygen family in the Sixth Periodic group other than oxygen, and thereafter cooling said body.

10. The method of forming electrode elements for dry rectifiers and the like, which comprises heating a metallic body in an oxidizing atmosphere until a relatively thick oxygen compound is formed thereon, quenching said heated body, thereafter heating said body in an atmosphere containing a chemical element of the oxygen family in the Sixth Periodic group other than oxygen, and thereafter permitting said heated body to cool slowly.

11. The method of forming electrode elements for dry rectifiers and the like, which comprises heating a copper plate in an oxidizing atmosphere to a temperature of substantially 1000° C. until a relatively thick oxide coating has been formed, quenching said coated electrode element in a non-oxidizing bath, and again heating said coated element in an atmosphere containing sulphur vapor until a relatively thick outer layer of a sulphur compound has been formed, and thereafter permitting said electrode element to cool.

12. The method of forming electrode elements for dry rectifiers and the like, which comprises heating a plate of copper in an oxidizing atmosphere to a temperature of substantially 1000° C. for a period of substantially five minutes, quenching said heated plate in a bath containing a non-oxidizing liquid, thereafter heating said plate in an atmosphere containing sulphur vapors to a temperature of substantially 425° C. for substantially five minutes, and thereafter permitting said plate to cool.

In testimony whereof I affix my signature.

SAMUEL RUBEN.